United States Patent
Sepeur et al.

(10) Patent No.: US 7,247,350 B2
(45) Date of Patent: Jul. 24, 2007

(54) SOLVENT-POOR SOL-GEL-SYSTEMS

(75) Inventors: Stefan Sepeur, Saarbrücken (DE); Nora Kunze, Saarbrücken (DE); Michael Kihm, Saarbrücken (DE)

(73) Assignee: Nano-X GmbH, Saarbrücken (DE)

( * ) Notice: Subject to any disclaimer, the term of this patent is extended or adjusted under 35 U.S.C. 154(b) by 0 days.

(21) Appl. No.: 10/450,994

(22) PCT Filed: Dec. 20, 2001

(86) PCT No.: PCT/DE01/04814

§ 371 (c)(1), (2), (4) Date: Jun. 18, 2003

(87) PCT Pub. No.: WO02/50191

PCT Pub. Date: Jun. 27, 2002

(65) Prior Publication Data

US 2004/0043161 A1  Mar. 4, 2004

(30) Foreign Application Priority Data

Dec. 20, 2000 (DE) .............................. 100 63 519

(51) Int. Cl.
  *B05D 3/02* (2006.01)
  *B05D 3/06* (2006.01)
  *C01B 33/14* (2006.01)
  *C08G 77/10* (2006.01)
  *B32B 5/00* (2006.01)

(52) U.S. Cl. .................. 427/387; 427/162; 427/164; 427/165; 427/372.2; 427/553; 428/429; 428/447; 524/588; 528/12; 528/39; 528/480; 528/491; 528/499

(58) Field of Classification Search ............... 428/428, 428/429, 446, 447, 448; 427/162, 164, 165, 427/372.2, 384, 385.5, 387, 532, 553; 528/10, 528/12, 39, 480, 491, 499; 524/588
See application file for complete search history.

(56) References Cited

U.S. PATENT DOCUMENTS

| | | | |
|---|---|---|---|
| 3,941,719 A | 3/1976 | Yoldas | |
| 4,278,632 A | 7/1981 | Yoldas | |
| 4,286,024 A | 8/1981 | Yoldas | |
| 4,346,131 A | 8/1982 | Yoldas | |
| 4,814,017 A * | 3/1989 | Yoldas et al. | 106/287.12 |
| 5,252,767 A * | 10/1993 | Maass et al. | 556/450 |
| 6,008,285 A | 12/1999 | Kasemann et al. | |
| 6,197,914 B1 * | 3/2001 | Kaeppler et al. | 528/32 |
| 6,624,237 B2 * | 9/2003 | Biteau et al. | 524/588 |
| 6,872,765 B1 * | 3/2005 | Betz et al. | 524/261 |
| 2002/0061407 A1 * | 5/2002 | Colton et al. | 428/447 |

FOREIGN PATENT DOCUMENTS

| | | |
|---|---|---|
| DE | 198 16 136 A1 | 10/1999 |
| EP | 0 399 148 A | 11/1990 |
| EP | 0 486 469 A | 5/1992 |
| EP | 0 927 733 A | 7/1999 |
| EP | 0 938 405 A | 9/1999 |
| WO | WO 99/52964 A | 10/1999 |
| WO | WO 00/35818 * | 6/2000 |
| WO | WO 00/53683 * | 9/2000 |

* cited by examiner

*Primary Examiner*—Michael J. Feely
(74) *Attorney, Agent, or Firm*—Henry M. Feiereisen; Ursula B. Day

(57) ABSTRACT

The invention relates to a method for the production of low solvent sol-gel systems, comprising the following steps: (a) hydrolysis or condensation of a silane and/or an alkoxide and/or several alkoxides of Al, Ce, Ga, Ge, Sn, Ti, Zr, Hf, V, Nb and Ta, (b) addition of water to the reaction mixture until phase separation sets in, and (c) separation of the condensate phase. The invention also relates to the sol-gel system thus obtained and to the use thereof.

18 Claims, No Drawings

SOLVENT-POOR SOL-GEL-SYSTEMS

BACKGROUND OF THE INVENTION

Subject matter of the present invention are low solvent sol-gel systems, their production and use.

Originally, the sol-gel process has been used to ultimately obtain ceramic masses or glasses from initially solvent compounds via the intermediate stage of a gel. A particular advantage of this process is the production of far more homogenous products as opposed to the classic ceramic methods. In addition, the production of superior coatings can be realized, wherein an alcoholic solution of hydrolysable alcoholates is applied with polyvalent metal ions on a surface and a metallic hydroxyl network is formed as the alcoholic solvent evaporates. This coating, which contains numerous MOH groups is hydrophilic and antistatic. As the temperature rises, the MOH groups react under dehydration to metal oxide groups so that the surfaces become hard and scratch-resistant. Oftentimes, such materials find application as binder materials. Production of stable phases (sols) typically involves the catalytic hydrolysis of alkoxy silanes with acids or bases in aqueous solution up to a certain degree, filling with siliceous sol or other particles, and adjustment with alcohols as solvent to a process-based predetermined solids content. Examples of application for such systems are non-abrasive coatings, corrosion protection, coatings suited to a refractive value, e.g. spectacle glasses or the like.

Some time ago, the use of nanoparticles for the afore-described production of stable phases has provided the basis for a significant development of respective coatings. As a consequence, further functions could be introduced into the systems contained as product, such as, e.g., a better adjustment of the refractive value or IR absorption and even higher abrasion resistances and dirt-repellent characteristics.

DE 198 16 136 A1 discloses a process for the production of sol-gel systems, in which the solvent, typically an alcohol, is removed from the reaction system preferably under reduced pressure. In this way, aqueous or alcoholic sol-gel systems have been produced which were present as single-phase, water-dilutable systems.

The teaching of the DE 198 16 136 A1 is based on the recognition that the extraction of the alcohol is required to develop the reaction, especially of the coating of nanoparticles with organically modified alkoxy silanes such that a system is established that is hydrolysis-stable and condensation-stable, wherein these systems can be used for the afore-mentioned coating purpose. The DE 198 16 136 A1 discloses the removal of alcohol exclusively under vacuum conditions and at temperature of up to 40° C. at the rotary evaporator.

SUMMARY OF THE INVENTION

It is therefore an object of the present invention to provide a method of making low solvent sol-gel systems, by which it is possible to make low solvent sol-gel systems through a simplest possible process in order to enhance the state of the art by at least one further method.

The present invention is attained by a method of producing low solvent sol-gel systems by hydrolyzing or condensating a silane and/or an alkoxide and/or several alkoxides of Al, Ce Ga, Ge, Sn, Ti, Zr, Hf, V, Nb and Ta, adding such an amount of water to the reaction mixture until a phase separation sets in, and separating the condensate phase. Furthermore, the object is attained by the use of a thus-obtained low solvent sol-gel system for coating a substrate as well as by the low solvent sol-gel system obtained by the method according to the invention, and a substrate provided with a coating of such a sol-gel system and dried subsequently.

It has been surprisingly found that the precipitation/emulsion process according to the invention leads to a stable sol phase by implementing through addition of a respective amount of water (in excess) to the reactive mixture a phase separation into a condensate phase which is insoluble in water and an aqueous phase, wherein the former contains the desired product and the latter contains undesired alcohol product and esterification products as well as water-soluble low-molecular condensates. The solvent content of the aqueous phase is dependent on the type of starting compounds and on the solubility of the obtained alcohol in the aqueous phase and on the separation efficiency ("amount of the extracted water and the applied extraction steps").The afore-mentioned process extracts from the water-insoluble phase with the desired product nearly all solvent. The residual content of the alcoholic solvent or alcohol in the condensate phase amounts generally to less than 5 wt. %, preferably less than 1 wt. % and especially preferred less than 0.5 wt. %, wherein the solvent content depends on the type of starting compounds and especially on the degree of water solubility of the condensate. The water-insoluble, low solvent phase can then be absorbed or dispersed in water through application of respective processes that are generally known.

Unlike the process according to DE 198 16 136 A1, there is now no possibility of experiencing, e.g., an undercooling of the condensate phase or sol phase and a crystallization of condensed silane particles. In other words, the method according to the invention facilitates the supervision of the method to produce low solvent sol-gel systems because of the absence of a separation of an alcohol or a solvent in vacuum so that there is no need to monitor that sensitive process parameters such as, e.g., pressure and temperature, are kept within a narrow regiment.

Basically, all possible silanes and/or one or more alkoxides generally of metal can be used, i.e. for hydrolysis or condensation in the method according to the invention.

In accordance with the invention, alkoxides of the elements Al, Ga, Ge, Sn, Ti, Zr, Hf, V, Nb and Ta are preferably used as metal alkoxides, whereby it is also possible to use other metal compounds such as e.g., Zn, Mo, W, Mn or Ce.

Preferably used as silanes are those which have organically cross-linked substitutes and/or partially or completely fluorinated substitutes. Such cross-linked groups, i.e. groups which generally are capable to realize additive reactions or condensation reactions, are generally known to the artisan in the present field and referred to, e.g., in the DE 198 16 136 A1.

Other preferably used silanes for the present invention include glycidyloxypropyl triethoxy silane (GPTES), 3-methacryloxypropyl trimethoxy silane (MPTS), methyl triethoxy silane (MTEOS), tetraethoxy silane (TEOS), vinyl triethoxy silane (VTES), vinyl trimethoxy silane (VTMS) and natural silanes such as tetramethoxy silane, tetraethoxy silane, tetra-n-propoxy silane, tetra-n-butoxy silane, cyclo-hexyl trimethoxy silane, cyclo-pentyl trimethoxy silane, ethyl trimethoxy silane, phenyl-ethyl trimethoxysilane, phenyl trimethoxy silane, n-propyl trimethoxy silane, cyclo-hexyl methyl dimethoxy silane, dimethyl dimethoxy silane, diisopropyl dimethoxy silane, phenyl methyl dimethoxy silane, phenyl ethyl trimethoxysilane, phenyl trimethoxy silane, phenyl methyl dimethoxy silane and phenyl dimethyl ethoxysilane. The last mentioned alkoxy silanes are hereby preferably used in combination with silanes or compounds that are capable for addition or condensation.

Although it has been shown that the condensate phase after separation has already sufficient storage stability and, in fact, is suitable for production of e.g. coatings, it is preferred according to a further development of the method of the invention to absorb the condensate phase again in water. In this way, it is possible to suit the sol-gel system to the demands of the intended use and the type of the used application process. Hereby, a further advantage is attained, when adding at first an emulsifying agent to the condensate phase, mixing the emulsifying agent with the condensate phase, and subsequently adding water to this mixing phase, because then the storage stability of the condensate phase and the obtained system can be advantageously further enhanced.

The absorption of the condensate phase in water, regardless whether with or without emulsifying agent, as well as the admixture of the emulsifying agent to the condensate phase, can be implemented with devices that are generally known in the field of mixing liquid substances for dispersing or homogenizing.

Examples of an emulsifying agent include commercially available tensides with the designation DISPONIL® by Cognis Co.

According to a particular further development of the method of the invention, the water-soluble compounds, employed in step a) of the method according to the invention, are converted through reaction with water-insoluble, preferably organic compounds, before or after hydrolysis or condensation, into a water-insoluble form because of its positive effect upon the realization of the condensate phase. Through introduction of the water-insoluble compound, the phase separation during addition of water is facilitated and the tendency to crystallize is surprisingly curbed in addition.

According to a further, particular configuration of the method of the invention, nanoparticles are added to the condensate phase. In this way, these nanoparticles can be coated with the condensate so that the properties of the nanoparticles can be respectively influenced. It is preferred to add, in relation to the condensate phase, 0.5 to 100 wt. % of nanoparticles to the condensate phase. Hereby, it is especially preferred when the nanoparticles have a size of 2 to 300 nm.

According to a further configuration of the method of to the invention, delustering agents and/or one or more compounds from the group of dyes, antifouling agents, antistatic agents, antifogging agents, corrosion inhibitors, slip additives as well as agents for adjusting the viscosity, can be further added to the sol-gel system, i.e. the condensate phase. These agents, which may be used individually or in combination, remain in the layer to be produced from the sol-gel system or the condensate phase, or in the formed body made herefrom, and impart these products the respective advantageous properties, so that the already advantageous properties relating to the particular scratch resistance and abrasion resistance and also the at least partially present transparency further complement one another.

As already stated, the preferred use of the low solvent sol-gel system, made by the method according to the invention, resides in the coating of a substrate. In order to implement such a coating, the sol-gel system is generally applied by a wet-chemical process onto a substrate, in particular through spraying, casting, flooding, immersing, hurling, rolling or impressing, whereby the mentioned processes involve processes that have all been perfected and can be efficiently carried out.

Flooding, immersing, hurling, rolling or impressing, whereby the mentioned processes involve processes that have all been perfected and can be efficiently carried out.

Drying and hardening of the sol-gel system according to the invention is implemented in general in a temperature range of about 20 to 500° C. for a time period which may be as short as one second or may last also several hours.

It is preferred to execute the drying in a forced-air oven or by means of suitable electromagnetic radiation, such as, e.g., UV radiation, IR radiation, electron radiation or microwave radiation. There are no particular limitations as far as the substrates to be coated with the sol-gel system of the present invention are concerned. In general, it is however preferred to make the substrate of ceramic, wood, metal, stone, plastic (varnished surfaces), glass and/or concrete, whereby it is especially preferred to repeat at least once the steps of application of the sol-gel system upon a substrate and the following drying. In this way, a more dense surface coating can advantageously be realized. Of particular advantage during repeated application is further the possibility to use sol-gel systems of different composition so that the resultant surface properties can be suited by the artisan in a very precise manner in accordance with respective requirements.

The sol-gel system according to the invention finds application in particular in furniture sheets and PC cards, whereby the particular scratch resistance of the coatings is hereby relevant, as binder for glass wool or rock wool, whereby the effect as binding agent and as flame-inhibiting agent is central, at applications for corrosion protection, for producing surfaces that are easy to clean or are self-cleaning, in particular also structured surfaces, as additive for commercial lacquer systems, for increase of the abrasion resistance and for improved dirt repellency through adjustment of the surface energy, on stones to reduce blooming, and as stain protector against coffee, red wine, graffiti or the like, as well as binding agent for paper, granular stone, wood, natural substances such as straw, textiles etc.

DETAILED DESCRIPTION OF PREFERRED EMBODIMENTS

The invention will now be described in more detail with reference to exemplified embodiments for the sole purpose of providing an understanding of the invention without being limiting in any way.

EXAMPLE 1 a) Production of a Low Solvent Condensate Phase 0.02 g of 1-methyl imidazole (M1) is added to 139.0 g of glycideoxypropyl triethoxy silane (GPTES), acquired from Degussa-Hüls, and stirred. Subsequently, 45.6 g of bisphenole A (BPA) is added and heated in a water bath for 30 min. to 80° C., while being stirred. As the additive reaction takes place, the reactive mixture changes its color from transparent yellow to dark brown. After the reaction, 28.4 g of 5% acetic acid is added for hydrolysis and hydrolyzed for 16 hours at room temperature. Subsequently, 200 g of deionized water are added and stirred for 10 min, thereby forming 2 phases. The low solvent and water-containing upper phase is separated in a separating funnel.

b) Production of an Emulsion (solids content about 15%)

25.0 g of the tenside DISPONIL® FES 992 IS (Cognis Co.) is added to 100 g of the dark brown, slightly viscous phase (condensate residue), heated in the water bath to 80°

C., and stirred. After 20 min, 375 g of water heated to 80° C. is added and homogenized with an ULTRATURAX® (IKA Co.) for 3 to 5 min.

The obtained dispersion may be applied by known wet-chemical application processes onto any substrate and is appropriate in particular for corrosion protection of light metals and steel, as non-abrasive coating for polymers or, in undispersed state, as printing ink or lacquer additive.

EXAMPLE 2 a) Production of a Low solvent Condensate Phase

Initially, the process corresponds to Example 1. After the additive reaction, indicated by a change of color of the reaction mixture from transparent yellow to dark brown, 5 g DYNASILAN® F 8261 (Degussa-Hüls) are added. After the reaction, 5% acetic acid are added for hydrolysis and hydrolyzed for 16 hours at room temperature. Subsequently, 200 g de-ionized water is added and stirred for 10 min, thereby forming two phases. The low solvent and water-containing upper phase is separated in the separating funnel.

b) Production of an Emulsion (solids content about 15%)

The emulsion is obtained in a same manner as in Example 1.

This dispersion may be applied by known wet-chemical application processes onto any substrate and is appropriate in particular for corrosion protection of light metals and steel, as non-abrasive coating for polymers or, in undispersed state, as printing ink or lacquer additive with low surface energy.

EXAMPLE 3 a) Production of a Low Solvent Condensate Phase 1.35 g of 10% formic acid is added to 24.8 g of HEMD® (Degussa-Hüls) and stirred for 3 hours. Subsequently, 0.32 g of aluminum sec-butoxide (Fulka Co.) are added and stirred for 2 hours at room temperature.

Subsequently, 25 g of water is added to the reaction mixture in a separating funnel and shaken well to thereby form two phases. The organic phase is directly separated after the phase separation. The mixture is hardened photo-chemically by adding 0.8 g of the photoinitiator Irgacure 5000 (Ciba Co.) The mixture is subsequently applied by a doctor onto the substrate, such as, e.g., polycarbonate plates but also on plates of stone, and dried by a high-pressure mercury radiator under a UV dryer in continuous operation at a radiation capacity of 2 J/CM$^2$. A scratch-resistant surface is obtained which exhibits good resistance with respect to steel wool.

b) Production of an Emulsion (solids content about 15%)

100 g of the slightly viscous phase (condensate residue) is mixed with 20.0 g of the tenside DISPONIL® 286 (Cogis Co.), heated in the water bath to 80° C. and stirred. After 20 min., 400 g of warm water heated to 80° C. is added and homogenized with an Ultraturax (IKA) for 3 to 5 min.

This dispersion can be applied by known wet-chemical application processes, such as spraying, immersing, rolling or the like, upon any substrate, and is appropriate in particular as non-abrasive coating for polymers or, in undispersed state, as printing ink or lacquer additive.

EXAMPLE 4 a) Production of a Low Solvent Condensate Phase 1.35 g of 10% formic acid is added to 24.8 g of HEMD® (Degussa-Hüls) and stirred for 4 hours at room temperature. Subsequently, 25 g of water is added in a separating funnel to the reaction mixture and well shaken to thereby form two phases. The organic phase is directly separated after the phase separation. The photochemical analysis is realized in a same manner as described in Example 3 under a).

b) Production of an Emulsion (solids content about 15%)

100 g of the slightly viscous phase (condensate residue) is mixed with 20.0 g of the tenside DISPONIL® 286 (Cogis Co.), heated in the water bath to 80° C. and stirred. After 20 min., 400 g of warm water heated to 80° C. is added and homogenized with an Ultraturax (IKA) for 3 to 5 min.

Typically, this dispersion can be applied by generally known wet-chemical application processes, such as spraying, immersing, rolling or the like, upon any substrate. It is appropriate in particular as non-abrasive coating for polymers or, in undispersed state, as printing ink or lacquer additive.

EXAMPLE 5 a) Production of a Low Solvent Condensate Phase 1.35 g of 10% formic acid is added to 24.8 g of MARMO® (Degussa-Hüls Co.) and stirred for 3 hours. Subsequently, 0.32 g of aluminum sec-butoxide (Fulka Co.) and 0.73 g DYNASILAN® F 8261 are added and stirred for 2 hours at room temperature. Subsequently, 25 g of water is added to the reaction mixture in a separating funnel and shaken well to thereby form two phases. The organic phase is directly separated after the phase separation. The photochemical analysis of the mixture is realized by adding 0.8 g of the photoinitiator Irgacure® 500 (Ciba Co.). The mixture is subsequently applied by a doctor onto substrates, such as, e.g., polycarbonate plates but also on plates of stone, and dried by a high-pressure mercury radiator under a UV dryer in continuous operation at a radiation capacity of 2 J/CM$^2$. A scratch-resistant surface with low surface energy (about 20 mJ/m$^2$) is obtained which exhibits good resistance with respect to steel wool.

b) Production of an Emulsion (solids content about 15%)

100 g of the slightly viscous phase (condensate residue) is mixed with 20.0 g of the tenside DISPONIL® 286 (Cogis Co.), heated in the water bath to 80° C. and stirred. After 320 min., 400 g of warm water heated to 80° C. is added and homogenized with an Ultraturax (IKA) for 3 to 5 min.

This dispersion can be applied by known wet-chemical application processes, such as spraying, immersing, rolling etc, upon a random substrate, and is appropriate in particular as non-abrasive coating for polymers or, in undispersed state, as printing ink or lacquer additive.

EXAMPLE 6 a) Production of a Low Solvent Condensate Phase 1.35 g of 10% formic acid are added to 24.8 g of MARMO® (Degussa-Hüls) and stirred for 3 hours. Subsequently, 0.32 g of aluminum sec-butoxide (Fulka Co.) and 0.73 g DYNASILAN® F 8861 are added and stirred for 2 hours at room temperature. Subsequently, 25 g of water is added to the reaction mixture in a separating funnel and shaken well to thereby form two phases. The organic phase is directly separated after the phase separation. The photochemical analysis of the mixture is realized by adding 0.8 g of the photoinitiator Irgacure® 500 (Ciba Co.). The mixture is subsequently applied by a doctor onto substrates, such as, e.g., polycarbonate plates but also on plates of stone, and, as described above, dried by a high-pressure mercury radiator under a UV dryer in continuous operation at a radiation capacity of 2 J/CM$^2$. A scratch-resistant surface with low surface energy (about 20 mJ/m$^2$) is obtained which exhibits good resistance with respect to steel wool.

b) Production of a Coating Solution (Dulled, Abrasion-resistant Coating)

11 g of a powder of calcium carbonate (CALZIMATT® 20 µm, Solvay Co.) is added to 11 g of the slightly viscous condensate phase and thoroughly mixed. After addition of 0.37 g of DAROCUR® 1173, this material can be applied, without further dilution, upon, e.g., marble. After UV hardening with a high-pressure mercury radiator under a UV dryer in continuous operation at a radiation capacity of 2 J/CM$^2$, a dull satin-finished surface which exhibits a high abrasion resistance, high resistance against coffee, red wine or other contaminants and has a high antiskid property.

EXAMPLE 7 a) Production of a Low Solvent Condensate Phase 1.35 g of zirconium butylate is added to 17.2 g of methyl triethoxy silane (MTEOS) (Degussa-Hüls Co.) and stirred. Subsequently, 10 g of 10% formic acid is added and stirred for 48 hours at room temperature. Subsequently, 25 g of water is added to the reaction mixture in a separating funnel and shaken well to thereby form two phases. The condensate phase (lower phase) is separated subsequently.

b) Production of an Emulsion (solids content about 15%)

100 g of the slightly viscous phase (condensate residue) is mixed with 20.0 g of the tenside DISPONIL® 286 (Cogis Co.), heated in the water bath to 80° C. and stirred. After 20 min., 400 g of warm water heated to 80° C. is added and homogenized with an Ultraturax (IKA) for 3 to 5 min.

This dispersion can be applied by known wet-chemical application processes, such as spraying, immersing, rolling etc, upon any substrate, and is appropriate in particular as binding agent for glass wool, rock wool, paper, granular stone, wood, natural substances (e.g. straw), textiles, etc..

What is claimed is:

1. A method of making a low solvent sol-gel system, comprising the steps of:

treating at least one compound selected from the group consisting of a silane, an alkoxide, and one or more alkoxides of Al, Ce, Ga, Ge, Sn, Ti, Zr, Hf, V, Nb, and Ta, by a process selected from the group consisting of hydrolyzing and condensating, to produce a reaction mixture until the reaction mixture is substantially in equilibrium;

subsequently adding water to the equilibrated reaction mixture in an amount sufficient to cause a phase separation into a condensate phase and an aqueous phase;

physically separating the condensate phase containing the low solvent sol-gel from said aqueous phase; and coating a substrate with the low solvent sol-gel.

2. The method of claim 1, wherein the silane is selected from the group consisting of glycidyloxypropyl triethoxy silane (GPTES), 3-methacrylic oxypmpyl trimethoxy silane (MPTS), methyl triethoxy silane (MTEOS), tetraethoxy silane (TEOS), vinyl triethoxy silane (VTES), and vinyl trimethoxy silane (VTMS).

3. The method of claim 1, wherein the silane is a natural silane selected from the group consisting of tetramethoxy silane, tetraethoxy silane, tetra-n-propoxy silane, tetra-n-butoxy silane, cyclo-hexyl trimethoxy silane, cyclo-pentyl trimethoxy silane, ethyl trimethoxy silane, phenyl-ethyl trimethoxysilane, phenyl trimethoxy silane, n-propyl trimethoxy silane, cyclo-hexyl methyl dimethoxy silane, dimethyl dimethoxy silane, dilsopropyl dimethoxy silane, phenyl methyl dimethoxy silane, phenyl ethyl trimethoxysilane, phenyl trirnethoxy silane, phenyl methyl dimethoxy silane and phenyl dimethyl ethoxysilane.

4. The method of claim 1, and further comprising the step of absorbing the condensate phase in water after the separating step.

5. The method of claim 1, and further comprising the steps of adding an emulsifying agent to the condensate phase after the separating step, mixing the emulsifying agent with the condensate phase to produce a mixed phase, and absorbing the mixed phase in water.

6. The method of claim 1, wherein a water-soluble component present in the aqueous phase is converted into a water-insoluble compound through reaction with a water-insoluble compound present in one of the phases, before or after the treating step.

7. The method of claim 1, and further comprising the step of mixing the condensate phase with 0.5 to 100 wt. % of nanoparticles in relation to the condensate phase.

8. The method of claim 7, wherein the nanoparticles have a size of 2 to 300 nm.

9. The method of claim 1, and further comprising the step of adding to the condensate phase at least one member selected from the group consisting of delustering agent, dye, antifouling agent, antistatic agent, antifogging agent, corrosion inhibitor, slip additive, additive for reducing surface energy, and agent for adjusting the viscosity.

10. The method of claims 1, wherein the coating step includes applying the sol-gel by a wet-chemical process upon the substrate.

11. The method of claim 10, wherein the wet-chemical process includes a process selected from the group consisting of spraying, casting, flooding, immersing, hurling, rolling, and impressing.

12. The method of claim 10, further comprising the step of drying the substrate at a temperature range of about 20 to 500° C.

13. The method of claim 12, wherein the drying step is carried out in a forced-air oven.

14. The method of claim 12, wherein the drying step is carried out by means of electromagnetic radiation.

15. The method of claim 14, wherein the electromagnetic radiation is selected from the group consisting of UV radiation, IR radiation, electron radiation, and microwave radiation.

16. The method of claim 12, wherein the applying and drying steps are repeated at least once.

17. The method of claim 16, wherein a repeated application includes an application of sol-gel systems of different composition.

18. The method of claim 1, wherein the substrate is made of at least one material selected from the group consisting of glass, ceramic, wood, metal, stone, plastic, and concrete.

* * * * *

UNITED STATES PATENT AND TRADEMARK OFFICE
CERTIFICATE OF CORRECTION

| | |
|---|---|
| PATENT NO. | : 7,247,350 B2 |
| APPLICATION NO. | : 10/450994 |
| DATED | : July 24, 2007 |
| INVENTOR(S) | : Stefan Sepeur et al. |

It is certified that error appears in the above-identified patent and that said Letters Patent is hereby corrected as shown below:

Column 7, Line 67:

Replace "oxypmpyl" with the correct --oxypropyl--;

Column 8, line 11:

Replace "dilsopropyl" with the correct --diisopropyl--.

Signed and Sealed this

Sixteenth Day of September, 2008

JON W. DUDAS
*Director of the United States Patent and Trademark Office*